United States Patent [19]

Becker et al.

[11] Patent Number: 5,016,335
[45] Date of Patent: May 21, 1991

[54] TAPPING ATTACHMENT FOR A PUNCH PRESS

[75] Inventors: Mark H. Becker, Vista; Scott D. Maynard, Newport Beach, both of Calif.

[73] Assignee: Robotics Automation Consulting Engineering Industries, Inc., La Mirada, Calif.

[21] Appl. No.: 345,792

[22] Filed: Apr. 24, 1989

[51] Int. Cl.⁵ .............................................. B23G 3/00
[52] U.S. Cl. ........................................ 29/57; 408/130; 408/137; 10/139 R; 74/20; 74/89.15
[58] Field of Search ............. 29/57; 10/129 A, 136 R, 10/136 TS, 139 CN, 139 R; 74/20, 89.15; 408/125, 129, 137, 138, 130, 141

[56] References Cited

U.S. PATENT DOCUMENTS

| | | | |
|---|---|---|---|
| 2,314,138 | 3/1943 | Garbe et al. | 408/125 X |
| 2,715,233 | 8/1955 | Clark | 10/139 R |
| 3,162,873 | 12/1964 | Ohme | 10/139 R |
| 3,200,426 | 8/1965 | Barr | 10/139 R |
| 3,499,342 | 3/1970 | Ligh | 74/89.15 X |
| 3,579,687 | 5/1971 | Hoshi et al. | 10/129 A |
| 3,661,470 | 5/1972 | O'Pry | 10/139 CN |
| 3,788,760 | 1/1974 | Daniels | 10/139 R X |
| 3,803,927 | 4/1974 | Lawler | 74/89.15 X |
| 4,050,835 | 9/1977 | Womack | 408/137 X |
| 4,449,868 | 5/1984 | Steinsberger et al. | 408/138 |
| 4,473,330 | 9/1984 | Chalier | 10/129 A X |
| 4,692,072 | 9/1987 | Pfigter et al. | 408/124 |
| 4,761,100 | 8/1988 | Maillard | 10/129 A X |

Primary Examiner—Larry I. Schwartz
Assistant Examiner—Robert Schultz
Attorney, Agent, or Firm—Morland C. Fischer

[57] ABSTRACT

A tapping attachment for threading a relatively large number of holes through a sheet metal part at a relatively low cost per hole. The tapping attachment includes a thrust bearing assembly which is aligned with a turret-type punch press or the like and movable in response to an axially directed force generated by the punch press. The axially directed force applied from the press to the thrust bearing assembly is transferred to a spline shaft. The spline shaft is rotated wihin and moved linearly relative to a screw threaded roller nut, whereby the axially directed force is converted into a rotating force for advancing and turning a tap at high speeds of rotation. A nitrogen reservoir is provided so that a supply of gas is available for returning the thrust bearing assembly and the spline shaft to their initial positions in order that a new hole can be tapped in response to another axially directed force. Also provided is an oil reservoir so that a supply of oil is available for lubricating and cooling the tap via an oil spout.

25 Claims, 8 Drawing Sheets

TAPPING ATTACHMENT FOR A PUNCH PRESS

BACKGROUND OF THE INVENTION

1. Field of the Invention

This invention relates to a tapping attachment, whereby an axially directed force generated by a turret-type punch press is converted into a rotating force for advancing and turning a tap, so that an array of holes may be efficiently and inexpensively threaded through a sheet metal part, or the like.

2. Background Art

A drill press and an associated tapping unit are typically used to tap holes formed in a sheet metal part. However, a drill press is known to be slow, labor intensive and, thereby, cost inefficient. moreover, a drill press is used merely to drill and not thread holes. Therefore, the metal part is subject to multiple handling stages and to separate operational steps of drilling and then threading holes.

Tapping attachments have been used in the past with conventional punch-type presses for tapping holes formed in metal parts. However, and generally speaking, such attachments are characterized by a large size, thereby rendering them cumbersome and not suitable for use with a numerically controlled punch press. The conventional tapping attachments are also known to include a transmission that, because of its high torque requirements, is often characterized by a complex gearing arrangement and a corresponding large size. Such a large size usually requires that the tapping unit be securely bolted onto the punch press. Consequently, there is no way by which the tapping unit may be easily detached from its press for repair or replacement.

It would be preferable to have available an efficient tapping unit that has a simple transmission and no gears, is of small size and relatively low cost, and is easily attachable to a numerically controlled turret-type punch press or the like so that holes can be punched and threaded through a sheet metal part with minimal handling and in an efficient and cost saving manner.

SUMMARY OF THE INVENTION

In general terms, a relatively light weight, low cost tapping attachment is described to be interfaced with a turret-type punch press, or the like, so as to control an associated tap for rapidly threading holes formed in a sheet metal workpiece at a low cost per hole. The tapping attachment includes a thrust bearing surface which is movable linearly, in response to an axial force generated by the punch press, from a first, at rest, position to a second, loaded position. As the bearing surface moves from the first to the second position, a set of pistons are correspondingly moved downwardly through respective cylinders formed in a valve body. Nitrogen gas, which is supplied from a gas reservoir to the cylinders so as to be compressed therein during the down stroke, expands to drive the pistons upwardly through their cylinders to thereby return the thrust bearing surface to the first position at which to receive another axial force generated by the punch press. Cutting oil is supplied from an oil reservoir to the tap to periodically lubricate and cool the tap during the threading operation.

A gearless transmission is provided to convert the linear movement of the thrust bearing surface into both linear and rotary movements of the tap. More particularly, a spline shaft having a multi-start, screw threaded end and an opposite spline threaded end is connected to and movable with the bearing surface. The screw threaded end of the spline shaft is moved axially through a roller nut, whereby to cause the spline shaft to rotate. The linear movement and rotation of the spline shaft is imparted to the tap by way of a spline nut and a lead screw. The lead screw has a threaded shaft which rotates in and moves axially through a stationary lead nut. The tap is interconnected by a collet with the lead screw shaft to that the tap is rotated and moved with said shaft. Accordingly, the tap is advanced to and rotated within the hole of the workpiece. However, by making the thread pitch of the tap and lead screw shaft smaller than the thread pitch of the threaded end of the spline shaft, the tap is advanced a smaller distance than the linear distance traveled by the spline shaft through the roller nut.

BRIEF DESCRIPTION OF THE DRAWINGS

FIG. 5a is a cross section showing an oil pump piston being retained at an oil pump actuator of the transmission housing of FIG. 5;

DESCRIPTION OF THE PREFERRED EMBODIMENT

Figure 1:
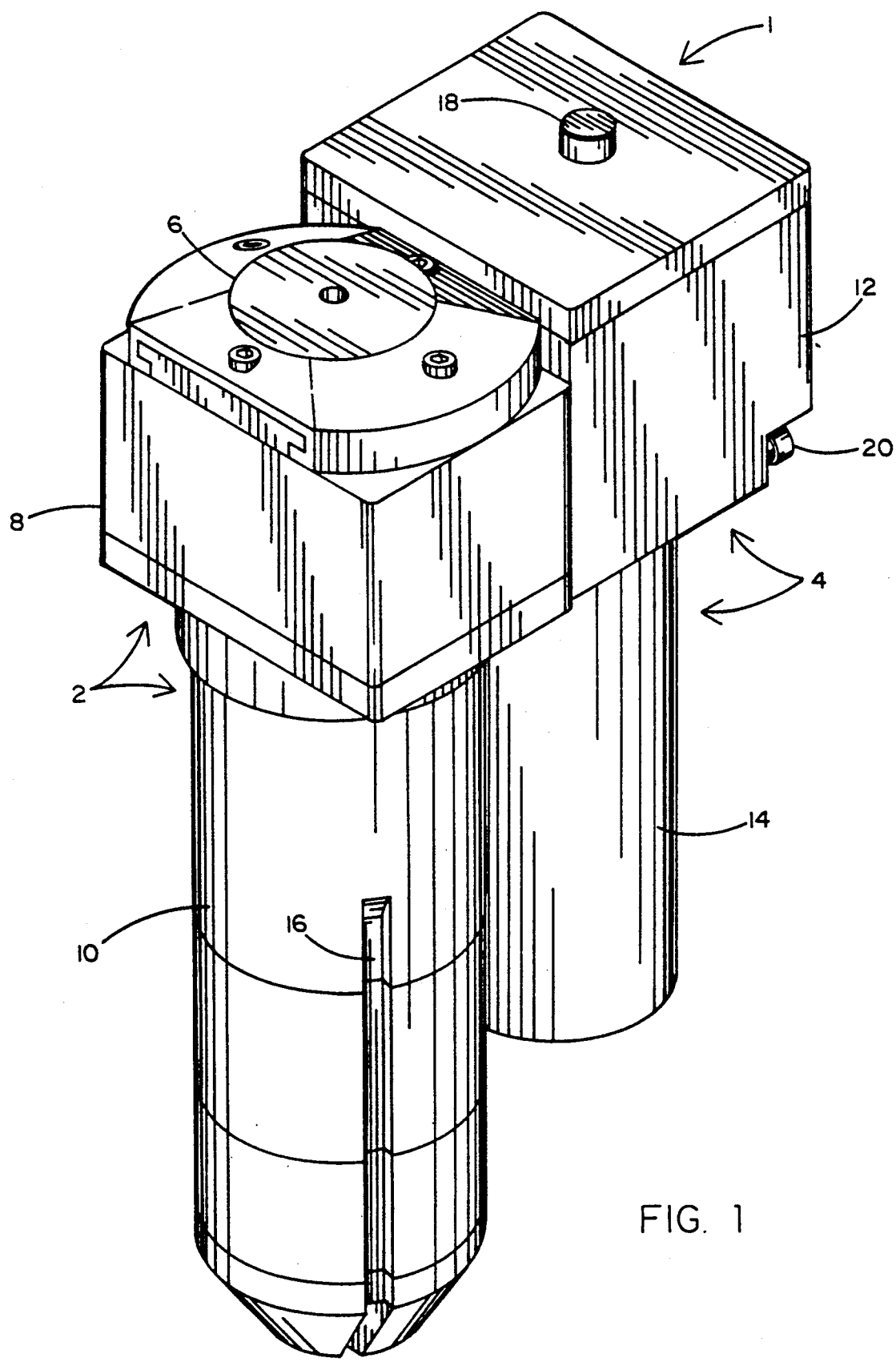
FIG. 1 is a perspective view of the tapping attachment which forms the present invention.

The tapping attachment 1 which forms the present invention and which is capable of rotating a tap at very high speeds (e.g. 10,000 RPM) is described while referring to the drawings, where FIG. 1 illustrates the interconnection of a tapping head assembly 2 with a reservoir assembly 4. The tapping attachment 1 may be interfaced with a conventional numerically controlled, turret-type punch press (not shown) so that an axially directed force generated by the press can be effectively converted into a rotary force for turning the tap at high speeds. The tapping head assembly 2 includes a thrust bearing assembly 6 which provides a bearing surface to receive the axially directed force generated by the punch press. As will be described in greater detail when referring to FIG. 3, thrust bearing assembly 6 includes a pair of thrust bearings which minimize friction with and receive the axial force generated by the punch press.

The tapping head assembly 2 of tapping attachment 1 includes an upper valve body 8 and a lower transmission housing 10. Valve body 8 (which is described in detail when referring to FIG. 4) includes the aforementioned thrust bearing assembly 6 that is initially spaced above the valve body (best shown in FIG. 7) and aligned for engagement by the punch press, so that the bearing assembly can be pushed downwardly towards the valve body 8 (as shown in FIG. 8) in response to an axial driving force. As will also be described, a supply of nitrogen gas is provided from a nitrogen reservoir 14 of reservoir assembly 4 to valve body 8 to drive the thrust bearing assembly 6 upwardly so as to return to its initial, spaced position relative to valve body 8 so as to be ready to receive another axial force generated by the punch press. Thus, it may be appreciated that bearing assembly 6 reciprocates relative to valve body 8 for the important purpose of transferring the axial force generated by the punch press to a rotary force for turning a tap by way of the transmission housing 10.

Transmission housing 10 includes means (which are described in greater detail when referring to FIGS. 5 and 6) for converting the axial movement of the bearing assembly 6 into a rotary movement of the tap. An axially extending keyway 16 is formed in the transmission housing 10 to align the tapping attachment 1 for connection to the punch press so as to prevent rotation of the tapping attachment relative to the press. An oil spout (designated 78 in FIG. 4) projects outwardly from an oil spout slot (best shown in FIG. 4) to supply lubricating oil to the tap.

The reservoir assembly 4 of tapping attachment 1 includes an upper cutting oil reservoir 12 and a lower nitrogen reservoir 14. A filler cap 18 is associated with oil reservoir 12 so that said reservoir can be loaded with oil. Similarly, a filler tube 20 is associated with reservoir 14 so that said reservoir can be filled with nitrogen gas.

Figure 2:
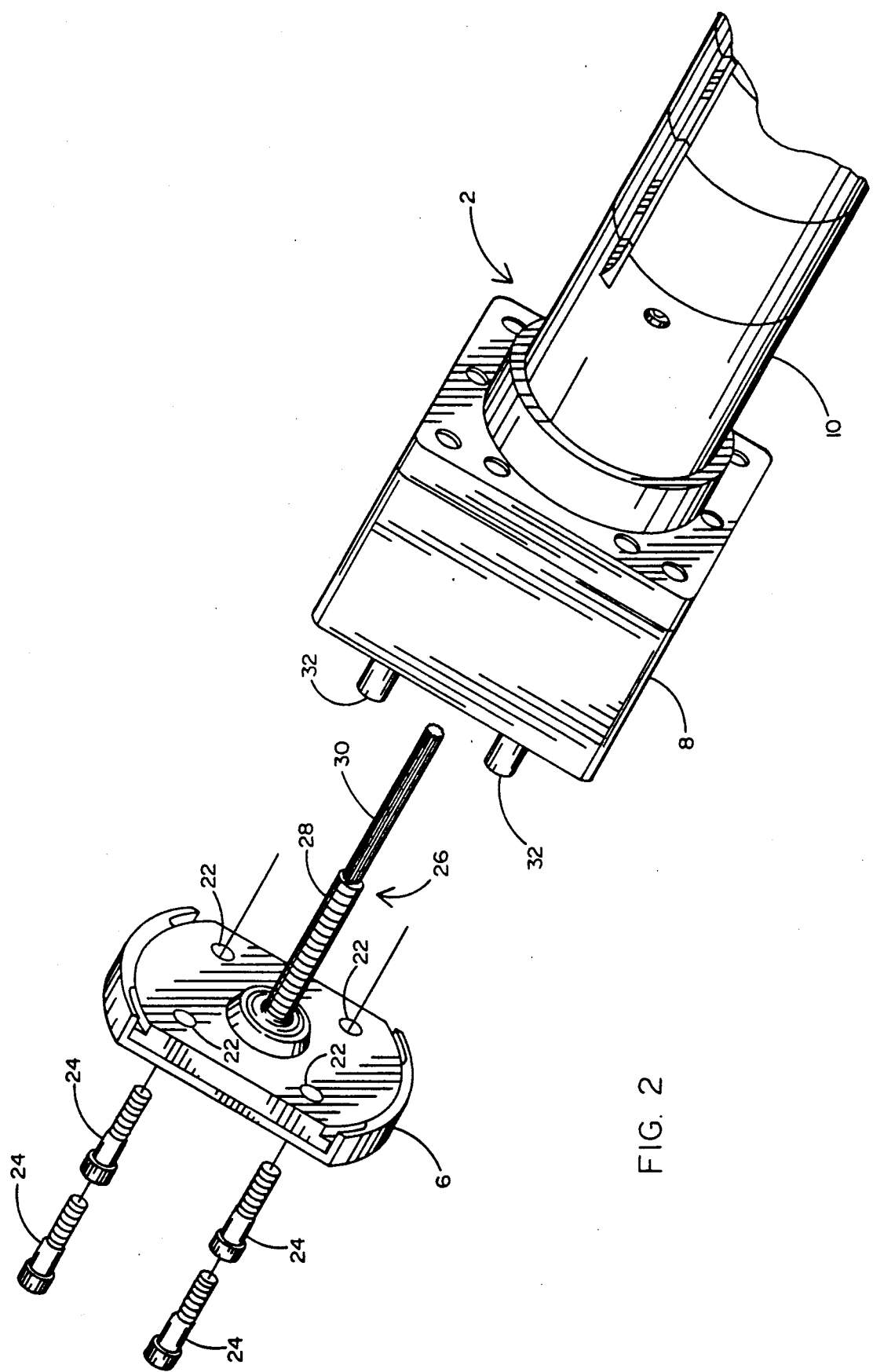
FIG. 2 shows the interconnection of a thrust bearing assembly and a valve body of the tapping attachment of FIG. 1.
Figure 3:
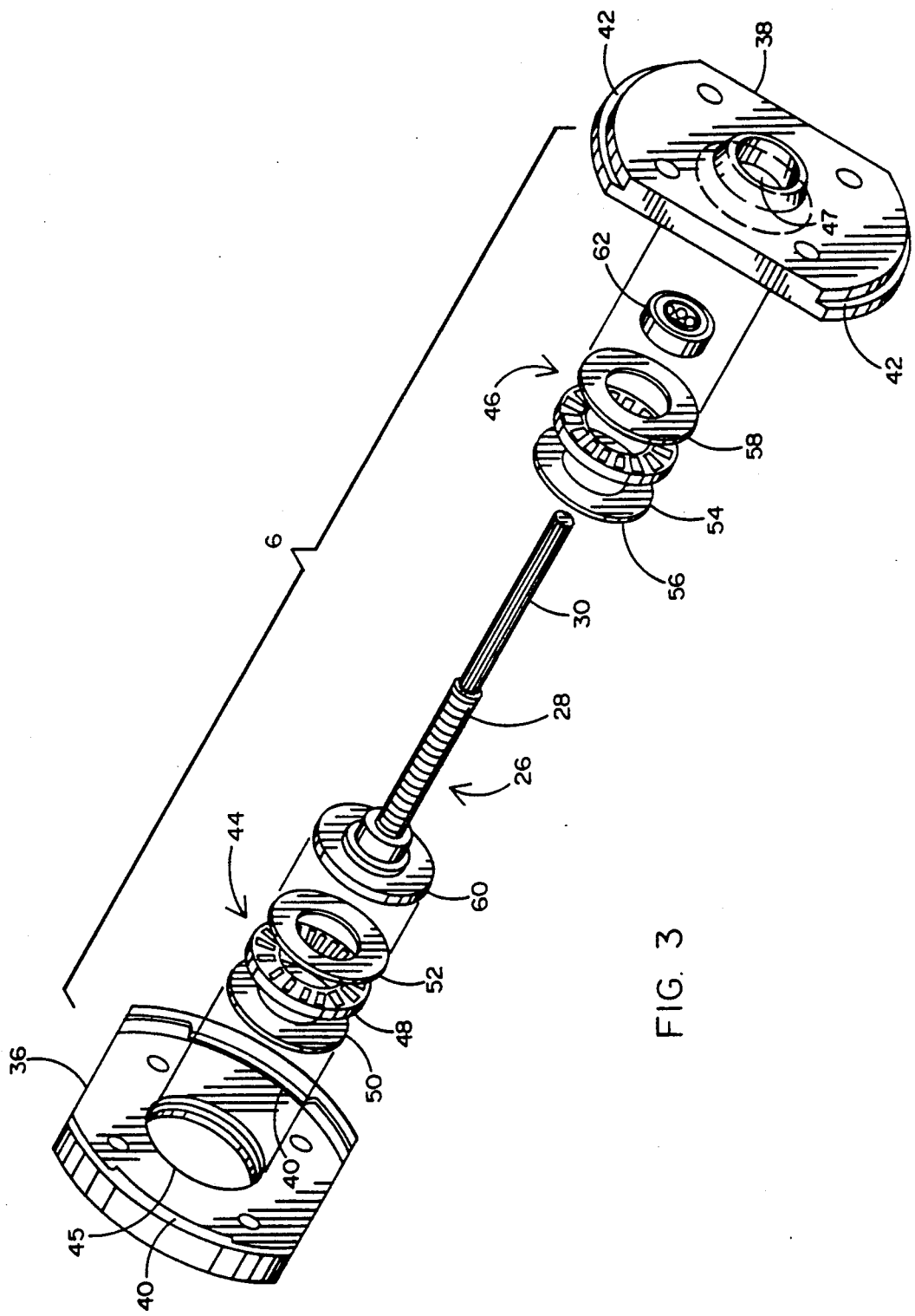
FIG. 3 is an exploded view of the thrust bearing assembly of FIG. 2.

Referring now to FIGS. 2 and 3 of drawings, the details of the thrust bearing assembly 6 of tapping attachment 1 are disclosed. Referring first to FIG. 2, the thrust bearing assembly 6 is shown having a plurality of (e.g. Dour) holes 22 through which a corresponding plurality of socket head cap screws 24 are to be received. Projecting outwardly from bearing assembly 6 (for receipt within the valve body 8 and transmission housing 10 of head assembly 2) is a spline shaft 26 having a multi-start threaded end 28 and an opposite spline end 30. The threaded end 28 of the spline shaft 26 includes four continuous screw threads extending therearound.

A set of (e.g. Four) pistons 32 (only two of which are visible in FIG. 2) are received within respective cylinders of the valve body 8 (best shown in FIG. 4), such that top ends of said pistons 32 project outwardly from the valve body 8 for receipt within respective holes 22 in bearing assembly 6 to be mated therein with screws 24. In the assembled relationship, each cap screw 24 is attached to a corresponding piston 32 within a respective hole 22 of the bearing assembly 6. In this manner, when the thrust bearing assembly 6 is moved downwardly towards valve body 8 in response to an axial force generated by the punch press, the cap screws 24 thereof are, likewise, moved downwardly, whereby to correspondingly push the pistons 32 into the valve body.

In FIG. 3, the thrust bearing assembly 6 is shown in an exploded configuration, with top and bottom bearing housings 36 and 38 released and separated from one another. That is, the top housing 36 has a locking lip 40, and the bottom housing 38 has a locking flange 42. In the assembled configuration (of FIG. 2), locking flange 42 is sized to be rotated below the locking lip 40 by which to releasably secure the top and bottom bearing housings 36 and 38 together.

As was earlier indicated, the thrust bearing assembly 6 includes a pair of thrust bearings. More particularly, bearing assembly 6 includes upper and lower thrust assemblies 44 and 46. Upper thrust assembly 44 includes a first thrust bearing 48 which is surrounded by top and bottom thrust washers 50 and 52. Similarly, lower thrust assembly 46 includes a second thrust bearing 54 which is also surrounded by top and bottom thrust washers 56 and 58. The upper thrust assembly 44 is sized to be received against a region 45 of the top housing 36 so as to be axially aligned with the punch press. The lower thrust assembly 46 is sized to be located above an opening 47 in the bottom housing 38, such that upper and lower thrust assemblies 44 and 46 and openings 45 and 47 are concentrically arranged relative to one another through the thrust bearing assembly 6.

The previously described spline shaft 26 is connected at its threaded end 28 to a thrust flange 60 which, in the assembled configuration, is supported between the bottom thrust washer 52 of upper thrust assembly 44 and the top thrust washer 56 of lower thrust assembly 46. Thus, the thrust flange 60 of spline shaft 26 will be located between the openings 45 and 47 of top and bottom housings 36 and 38. Moreover, the threaded and spline ends 28 and 30 of spline shaft 26 will extend through the lower thrust assembly 46 to project outwardly from the opening 47 of bottom housing 38 (as shown in FIG. 2). However, a ball bearing 62 is received within opening 47 to provide support for the spline shaft 26 and prevent the lateral displacement thereof relative to bottom housing 38.

Figures 4, 4A:
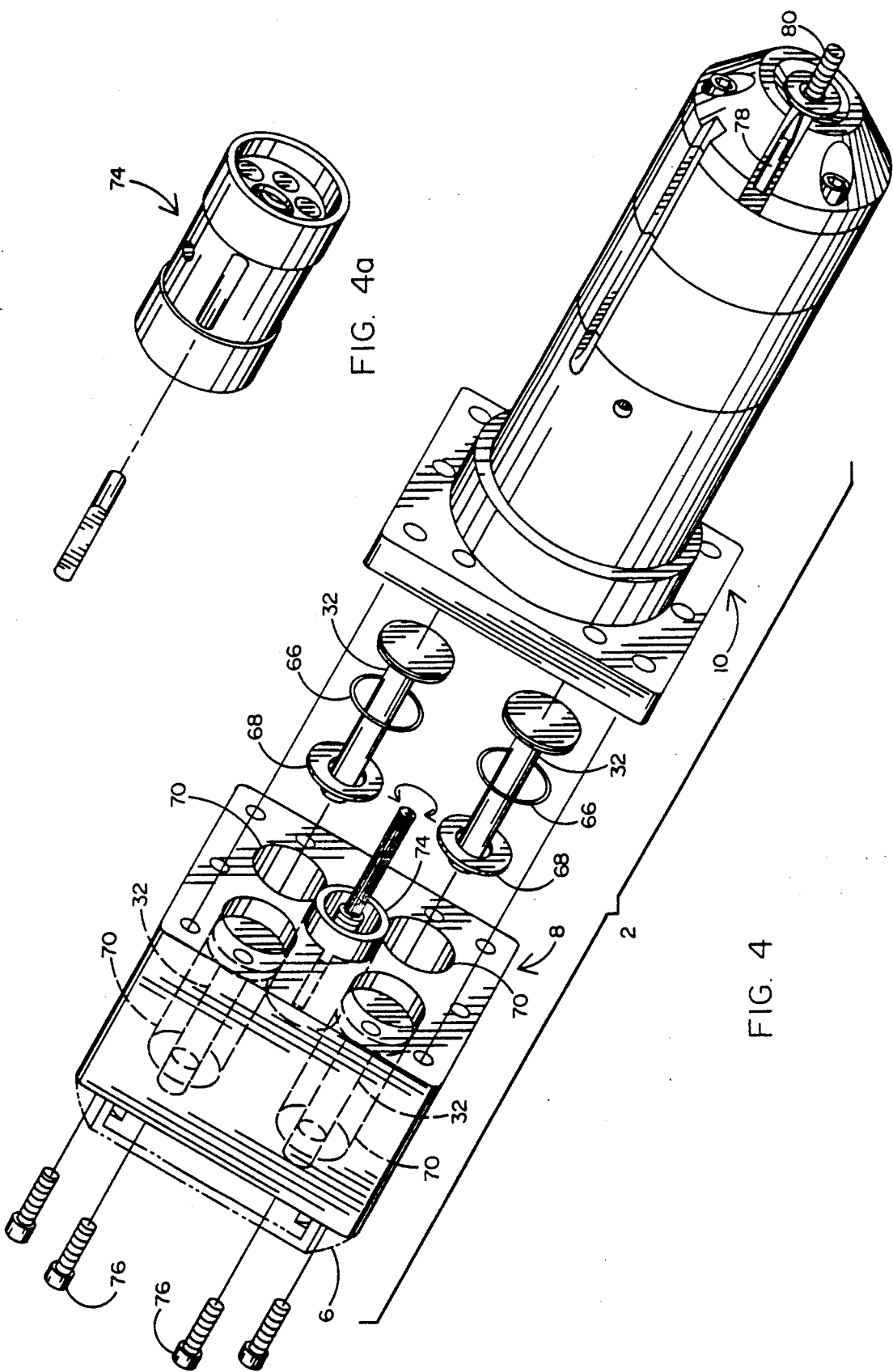
FIG. 4 shows the detachable interconnection of the valve body and a transmission housing of the tapping attachment.
FIG. 4a shows an enlarged view of a commercially available roller nut which is located between the valve body and transmission housing of FIG. 4.

FIG. 4 of the drawings shows the tapping head assembly 2 of the tapping attachment with the valve body 8 and transmission housing 10 thereof disconnected from one another. As previously described while referring to FIG. 2, the valve body 8 includes a plurality of (e.g. four) pistons 32, each of which having a seal 66 and a shock absorbing (e.g. urethane) bumper 68 surrounding its shaft. The pistons 32 are located in respected cylinders 70 so as to be interfaced with the thrust bearing assembly 6 and responsive to an axial driving force generated by the punch press (in the manner indicated when referring to FIG. 2). That is, the pistons 32 will be moved downwardly through cylinders 70 during the down stroke when the punch press strikes the bearing assembly 60 to drive said bearing assembly towards valve body 8. The cylinders 70 are at atmospheric pressure during the up stroke of the pistons 32, and, therefore, each cylinder 70 is provided with an air relief opening (not shown) to the atmosphere to avoid a compression condition during the up stroke and a vacuum condition during the down stroke.

As an important aspect of the present invention, an internally threaded roller nut 74 (best illustrated in FIG. 4a) which is commercially available from SKF Component Systems Company of Bethlehem, Pa., is fixably mounted at the valve body 8 for receipt of the spline shaft 26, so that an axial or linear driving force (generated by the communication of a punch press with the thrust bearing assembly 6) can be translated into a rotary force by which to turn the tap 80. Roller nut 74 is keyed within an opening through valve body 8 to prevent rotation thereof. The roller nut 74 is characterized as a low friction, high torque device which is used in the present invention to replace the large size and complex gearing arrangement common to conventional tapping units and minimize the possibility that threads of the spline shaft 26 might be stripped under the high impact driving forces generated by the punch press. The threaded end (designated 28 in FIG. 3) of the spline shaft 26 rotates at very high speeds through the threaded interior of the roller nut 74, and the pistons 32 of valve body 8 move downwardly through cylinders 70 when an axially or linearly directed driving force is applied to bearing assembly 6. An end of the roller nut 74 projects outwardly and downwardly from valve body 8 for receipt within a corresponding opening in the transmission housing 10 to form a reliable means for aligning the valve body 8 with the transmission housing 10.

The valve body 8 and transmission housing 10 are connected to one another by a suitable number of socket head cap screws 76 which extend downwardly through a plurality of suitably aligned screwholes. An oil path (best shown in FIGS. 7 and 8) extends from the oil reservoir (12 in FIG. 8) to an oil spout 76 at the bottom of transmission housing 10. The oil spout 78 is located adjacent the tap 80 so that said tap can be lubricated and cooled.

Figure 5:
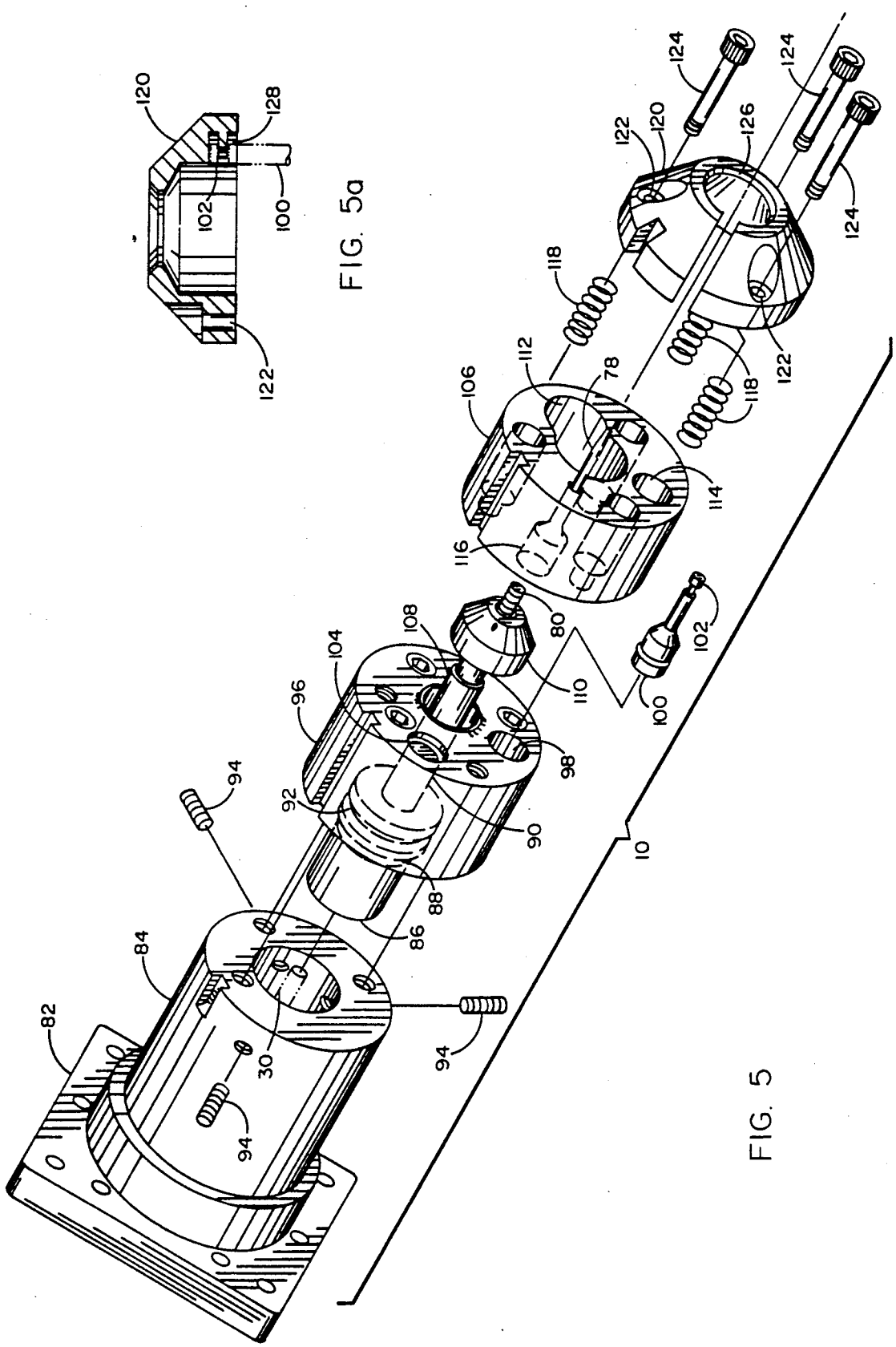
FIG. 5 is an exploded view of the transmission housing of FIG. 4.
Figure 6:
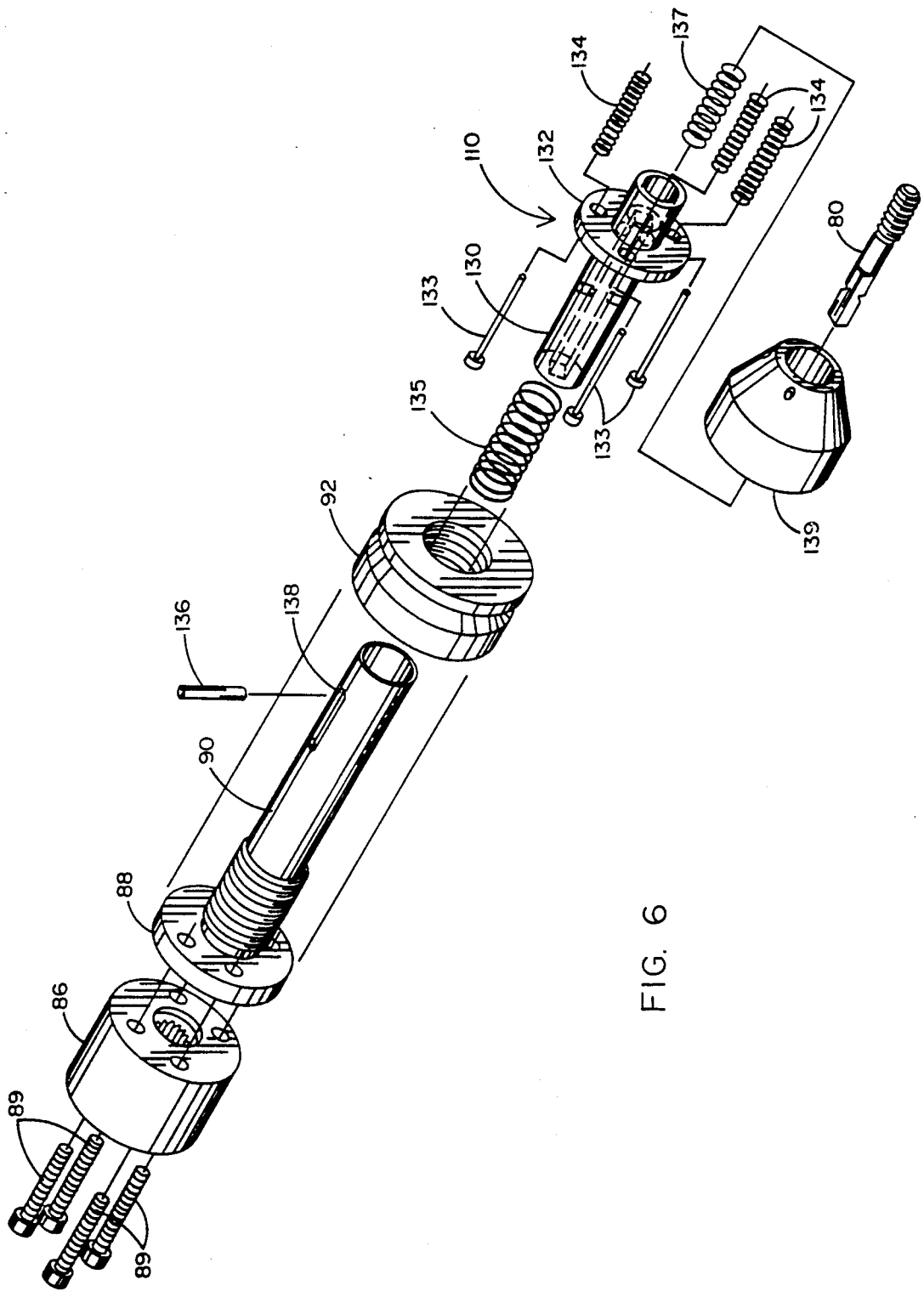
FIG. 6 is a still further exploded view of the transmission housing.

Details of the transmission housing 10 are best explained while referring to FIGS. 5 and 6 of the drawings. In FIG. 5, the housing 10 is shown including a mounting flange 82 which is mated to the bottom of the valve body by means of the previously mentioned cap screws (76 in FIG. 4). Extending downwardly from mounting flange 82 is a hollow lead nut housing 84. As is also shown in FIG. 6, a spline nut 86 having an internal spline threaded body is attached to the head of a lead screw 88 by means of socket head cap screws 89. Lead screw 88 has an axially projecting lead screw shaft 90, a portion of which is threaded, so as to retain a lead nut 92 thereon. When in the assembled relationship, the spline nut 86 is located completely with the hollow interior of lead nut housing 84, and the lead nut 92 is located partially within and secured to lead nut housing 84 by a spaced array of socket head set screws 94. Moreover, the spline end 30 of the spline shaft (26 of FIG. 3) is received within the internally threaded spline body of spline nut 86 so that a rotational force imparted to said spline shaft can be transferred to said spline nut and to the lead screw 88 connected thereto. In this manner, and as will be explained in greater detail hereinafter, a rotation of spline nut 86 causes a corresponding rotation and linear advancement of the tap 80 via lead screw shaft 90.

The lead nut 92 is affixed to an oil pump body 96, and each of the lead nut and oil pump body are threaded onto the lead screw shaft 90 such that the lead nut 92 and oil pump body 96 are stationary relative to spline nut 86 and lead nut 92. The oil pump body 96 has a central opening and a series of axially extending passages formed therethrough. One of the passages 98 in oil pump body 96 is sized to receive therein an oil pump piston 100 so that an oil pump can be created to periodically squirt oil, under pressure, from the oil reservoir (12 of FIG. 1) to the oil spout 78 for lubricating and cooling the tap 80. Another passage 104 is sized to receive a check valve (designated 144 in FIG. 8) to control the flow of oil to oil pump 100. Other passages in oil pump body 96 are sized to accommodate a first set of screws 124 for connecting the pump body 96 to an adjacent spacer 106 and a second set of screws for connecting pump body 96 to lead nut housing 84. An opening in oil pump body 96 is also included to accommodate a check valve (designated 144 in FIG. 8). Located within the central opening of the oil pump body 96 to surround the lead screw shaft 90 is a linear/rotary bearing (designated 107 in FIG. 7). Interfaced with this linear/rotary bearing is a sleeve 108 and a quick disconnect collet 110 which releasably retains the tap 80.

The spacer 106 which is connected to oil pump body 96 by bolts 124 also has a central opening and a series of axially extending passages formed therethrough. Coextensively formed with the central opening of spacer 106 is a relatively large keyway 112 to receive the collet 110 during assembly so that the spacer 106 and oil pump body 106 can be connected to one another while permitting the tap 80 to project outwardly therefrom. Another passage 114 formed through spacer 106 is aligned with the passage 98 of oil pump body 96 and sized to receive the oil pump piston 100. The oil spout 78 communicates with a piston relief passage 116 so that oil pumped by piston 100 can be provided via spout 78 to the tap 80. Some of the passages formed through spacer 106 are to receive the aforementioned set of screws 124 while the remaining passages are to receive first ends of respective actuator return springs 118.

The opposite ends of the actuator return springs 118 are received at an oil pump actuator 120. The springs 118 initially bias the oil pump actuator 120 and spacer 106 in spaced alignment with one another. A plurality of socket head shoulder screws 124 are received through holes 122 in oil pump actuator 120 so that said actuator is slidable reciprocally thereon. The screws 124 also extend through passages in the spacer 106 and oil pump body 96 to interconnect said spacer and pump body. Oil pump actuator 120 has a centrally disposed opening within which the tap 80 is located and isolated (i.e. protected) from the workpiece. The tap 80 is movable a short distance in a linear direction (when the punch press generates an axially directed driving force and the spline end 30 of the spline shaft moves into spline nut 96) so as to project outwardly through the central opening of actuator 120 to tap a hole of the workpiece.

It is preferable to provide oil pump actuator 120 with a chamfered end surface 126 which will deflect extrusions in the sheet metal part and thereby prevent a possible shearing of said extrusions. It is also preferable to provide the oil pump actuator 120 with a keyway 128 (best shown in FIG. 5a) which engages the head 102 of the oil pump piston 100 to fix the piston relative to the pump actuator 120. In this manner, everytime that the transmission housing 10 is pushed downwardly and into contact with a workpiece to tap a hole therein (in response to an axial force generated by the punch press) the oil pump actuator 120 is moved upwardly towards spacer 106 against the bias of actuator return springs 118. The upward movement of actuator 120 causes a corresponding movement of oil pump piston 100, the head 102 of which is interconnected with the actuator at keyway 128. Accordingly, oil is delivered, under pressure, to the tap 80 by way of the piston relief passage 116 and the oil spout 78 of spacer 106. After a hole has been tapped and the transmission housing 10 is moved out of contact with the workpiece, the normal bias of springs 118 automatically advances the oil pump actuator 120 downwardly to its initial position in spaced alignment with spacer 106.

It may be appreciated that the combination of elements illustrated in FIG. 5 and located within transmission housing 10 forms a gearless transmission which is of reduced size, complexity and cost relative to the geared transmissions of conventional tapping units. More particularly, and as previously disclosed, the axial force applied by the punch press to the thrust bearing assembly (6 in FIG. 2) induces a rotation of the spline shaft 26 by means of the roller nut (74 in FIG. 4). The rotary motion of spline shaft 26 is transferred from the spline end 30 thereof to the lead screw 88 via the spline nut 86, whereby to cause a corresponding rotation of the lead screw shaft 90. However, the head of the lead screw 88, which rotates with the screw shaft 90, moves linearly towards the stationary lead nut 92 at a slower rate than the spline end 30 moves linearly through spline nut 86. Hence, the linear motion of the thrust bearing assembly 6 is converted into a rotary motion of the spline shaft 26 (at the roller nut 74 of FIG. 4), and a relatively large linear motion of the spline shaft is translated into a smaller more accurately controlled linear motion of lead screw 88 and, accordingly, the tap 80 via lead screw shaft 90. By way of specific example, because of the receipt and linear movement of the spline end 30 of spline shaft 26 at the internal spline of spline nut 86, an approximately 32 mm linear movement of the thrust bearing assembly (6 of FIG. 4) towards the valve body (8 of FIG. 4) in response to an axial force generated by the punch press is translated into an approximately 6.5 mm linear movement of the tap 80 outwardly from the oil pump actuator 120 and into the hole of a workpiece.

The foregoing translation of linear motion between the thrust bearing assembly 6, the spline shaft 26 and the tap 80 is accomplished by establishing equal thread pitches on the lead screw shaft 90 and the tap 80. However, the thread pitch of the screw threaded end of the spline shaft (which may be varied, as desired) is larger than the thread pitches of tap 80 and shaft 90. Therefore, should it be desired to change the pitch of tap 80, a corresponding change in pitch must be introduced to the lead screw 88 and lead nut 92.

Referring to FIG. 6, details of the quick disconnect collet 110 are provided for releasably retaining the tap 80 at the end of transmission housing 10. Collet 110 includes a collet sleeve 130 which is surrounded by a collet flange 132. The tap 80 is retained at a notch thereof within a set of balls located in collet sleeve 130. A plurality of pins 133 extend through apertures in the collet flange 132 to receive a respective plurality of coil springs 134. An additional coil spring 137 is received through the interior of collet sleeve 130 to bias tap 80 in a direction outwardly of the sleeve 130 to make for an easy removal in case the tap is broken during use. The remaining coil springs 134 provide the spring action necessary to remove the tap 80 from collet sleeve 130 under normal operating conditions. A compression spring 135 is located at the interior of the lead screw shaft 90, and one end of the collet sleeve 130 is positioned within the screw shaft 90 ahead of spring 135. Spring 135 permits the collet sleeve 130 to move rearwardly through lead screw shaft 90 to avoid breaking the tap 80 in the event that the tap fails to find a hole in the workpiece after a linear movement towards such workpiece. A roll pin 136 is moved through an axial slot 138 formed in lead screw shaft 90 and through openings formed in the collet sleeve 130 to hold the sleeve and spring 135 within shaft 90. Lastly, a conical collet tip 139 surrounds the collet sleeve to protect the tap 80 projecting outwardly therefrom. The collet tip is movable rearwardly and against the normal bias of springs 134 to move the tap 80 away from its retaining balls and thereby permit a quick and easy removal of said tap from the sleeve 130. Should it be necessary to change the size of the tap, such change is accommodated by also changing the lead screw 88, lead nut 92 and the collet 110.

Figure 7:
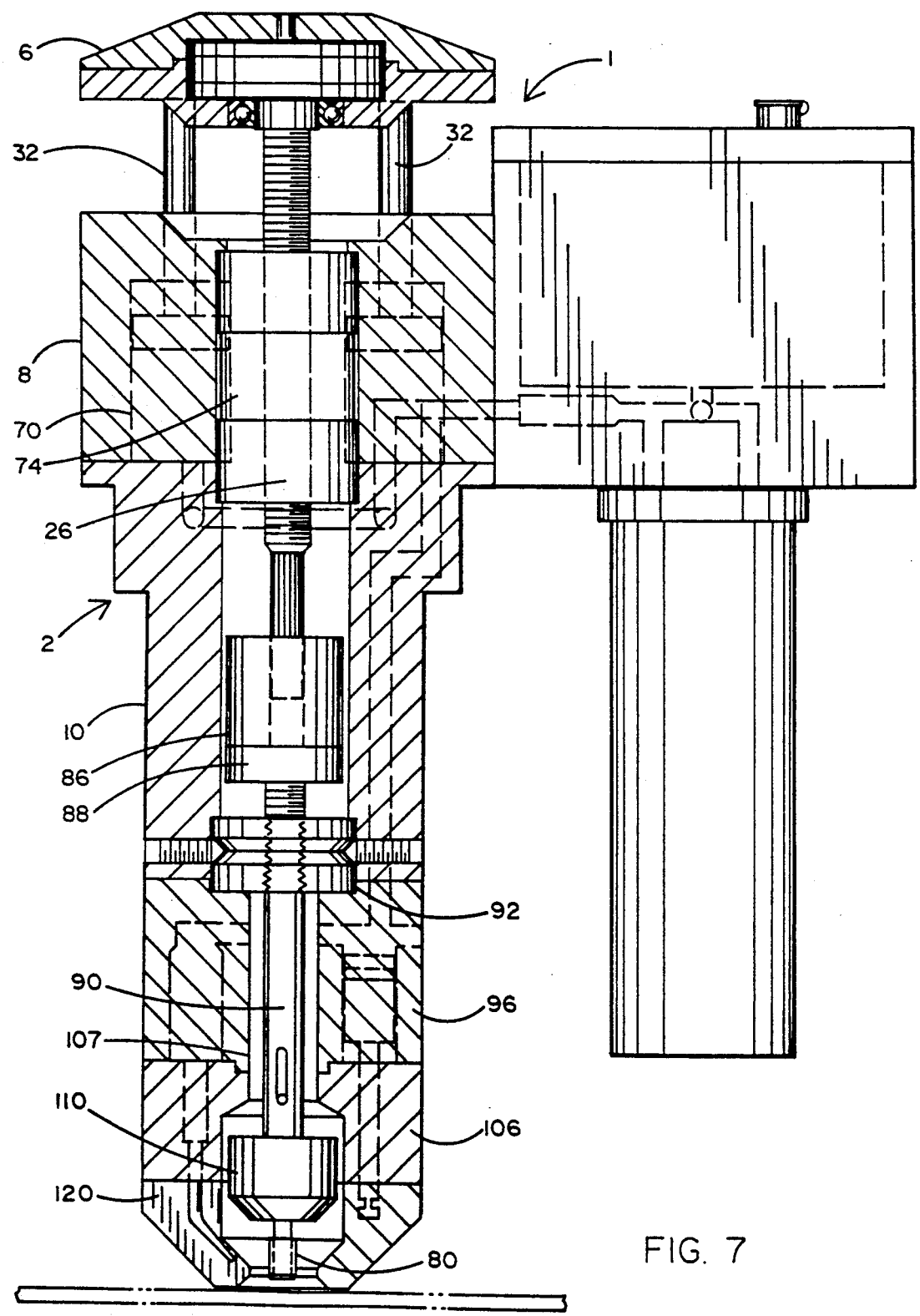
FIG. 7 is a partial cross-section of the tapping unit in a relaxed configuration.
Figure 8:
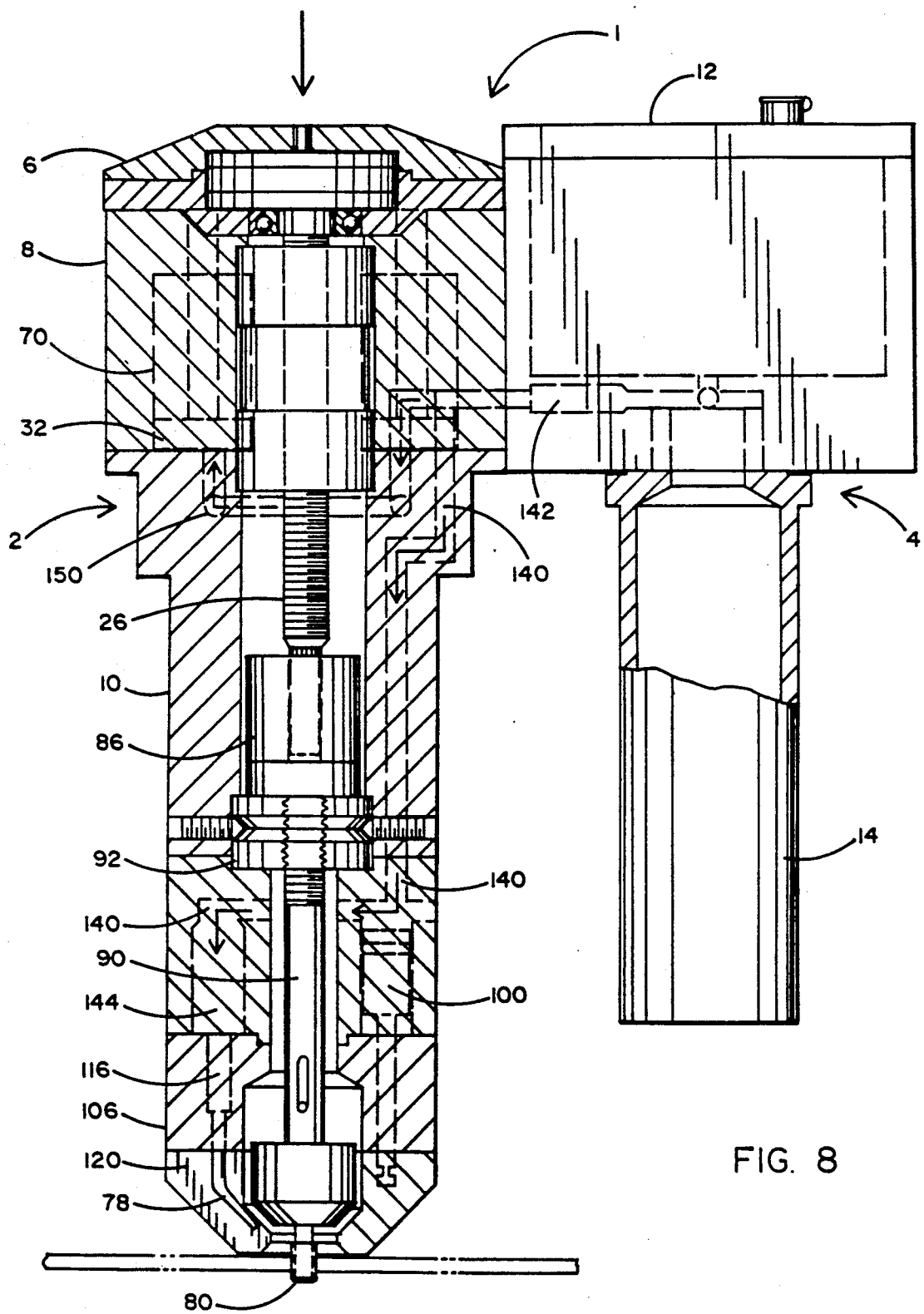
FIG. 8 is a partial cross-section of the tapping unit in a loaded configuration in response to an axially directed force generated by a punch press.

FIG. 7 of the drawings is a cross section of the tapping head assembly 2 of the tapping attachment 1 and the interconnection of the gearless transmission which extends through valve body 8 and transmission housing 10 for rotating and advancing the tap 80. The tapping head attachment 1 of FIG. 7 is in the at rest configuration with the thrust bearing assembly 6 thereof spaced (e.g. approximately 32 mm) above the valve body 8 by means of pistons 32. The tap 80 is retracted in and protected by oil pump actuator 120. In the at rest configuration, the thrust bearing assembly 6 is aligned with the punch press to receive an axially directed force therefrom whereby to drive bearing assembly 6 towards valve body 8 and pistons 32 through their respective cylinders 70 (as shown in FIG. 8).

As previously described, the relatively complex and large size gearing arrangements common to the transmissions of conventional tapping units is advantageously replaced, in the present invention, by the linear and streamlined alignment of transmission components including the spline shaft 26 connected between thrust bearing assembly 6 and spline nut 86 via the roller nut 74, whereby the axially directed force generated by the punch press is converted into a first rotary force by the roller nut 74. Moreover, the lead screw shaft 90 is interconnected between the lead screw 88 and the collet 110 by way of lead nut 92 and the linear/rotary bearing 107 of oil pump body 96, so that a first rotary force developed by spline shaft 26 and the axial displacement of shaft 26 relative to the hollow interior of spline nut 86 can be translated into a second rotary force and an axial displacement of the tap 80. That is to say, and as was previously described in detail, the pitch of the thread on the lead nut 92 and lead screw shaft 90 is equal to the pitch of the tap 80. However, the pitch of the threaded end of spline shaft 26 is greater than that of tap 80. Different pitches as just described are possible because of the ability of spline shaft 26 to both rotate in and move linearly through the splined interior of spline nut 86. Thus, should the pitch of the lead nut 92 or lead screw shaft 90 be changed, then a corresponding change may be achieved in the tap 80.

FIG. 8 of the drawings shows the tapping assembly 1 of FIG. 7 in the loaded condition after an axial driving force has been generated by the punch press and applied to the thrust bearing assembly 6 (in the direction of the reference arrow). In this case the bearing assembly 6 is driven downwardly and into contact with valve body 8 such that pistons 32 are moved through their respective cylinders 70 to compress the gas therewithin. Moreover, the spline shaft 26 is both rotated in and moved axially through the hollow splined interior of spline nut 86, whereby to cause a corresponding rotation and axial displacement (via lead screw shaft 90 of transmission housing 10) of the tap 80 for receipt by and threading of a hole in a sheet metal workpiece. That is, a rotation of spline shaft 26 causes a rotation of spline nut 86 relative to the stationary lead nut 92 and, therefore, an axial displacement of tap 80 via lead screw shaft 90.

As was previously disclosed when referring to FIG. 5, each time that the thrust bearing assembly is advanced, the oil pump actuator 120 is also advanced into contact with the workpiece, whereby oil is squirted from the oil spout 78 to the tap 80. More particularly, and was also previously disclosed, the axial displacment of oil pump actuator 120 towards the workpiece causes a corresponding displacement of the oil pump piston 100 which is connected thereto (best shown in FIG. 5 and 5a). Accordingly, cutting oil is pumped from the hollow oil reservoir 12 of reservoir assembly 4 to oil spout 78 by way of an oil supply path 140 (represented by solid referenced arrows) including a first check valve 142, a second check valve 144, and relief passage 116 through spacer 106.

What is more, a supply of nitrogen gas is provided from the hollow nitrogen reservoir 14 of reservoir assembly 4 to the cylinders 70 of valve body 8 via a gas supply path 150 (represented by broken reference arrows). In this manner, the cylinders 70 will contain a fresh supply of gas to be compressed therewithin during the downstroke of pistons 32 so that said pistons can be driven upwardly through their cylinders 70 as the compressed gas expands. Accordingly, the thrust bearing assembly 6 and tap 80 are moved upwardly relatively to valve body 8 and oil pump actuator 120, respectively, the spline shaft 26 is retracted relative to spline nut 86 and the tapping attachment 1 is reset to the at rest configuration of FIG. 7 to await another axially directed force generated by the punch press for tapping a different hole in the workpiece. Thus, it will be appreacited that the pistons 32 are reciprocated through their cylinders 70 by means of the punch press, in a first direction, and by the expansion of the compressed nitrogen gas, in the opposite direction, so that the gearless transmission of the tapping attachment 1 of this invention can be characterized by a spring-like efficiency for reliably tapping holes at very high speeds and, therefore, at a reduced cost per hole.

It will be apparent that while a preferred embodiment of the invention has been shown and described, various modifications and changes may be made without departing from the true spirit and scope of the invention. For example, although the tapping attachment of this invention has been described as having particular application to a turret-type punch press, it is to be understood that the tapping attachment may also be interfaced with a conventional punch press or a hydraullic or hydro-mechanical punch press, as well.

We claim:

1. A tapping attachment having a threaded tap by which to tap a hole formed in a workpiece and a body to be received at and supported by a press of the type having reciprocally movable force generating means, said tapping attachment comprising:

surface means aligned with the press to receive a force generated thereby and movable linearly from a first position to a second position in response to the force generated by the press;

shaft means interfaced with said surface means and movable linearly therewith in response to the force generated by the press;

means located between said shaft means and the tap to convert the linear movement of said shaft means into both linear and rotary movements of the tap to advance the tap into and thread the hole in the workpiece; and pneumatically operated means cooperating with said surface means and adapted for movement therewith for returning said surface means to the first position from the second position when the force generated by the discontinued so as to withdraw the tap from the hole in the workpiece.

2. The tapping attachment recited in claim 1, wherein said shaft means includes a flange located at a first end thereof and said surface means includes first and second thrust bearings for receiving and retaining therebetween said flange at the first end of said shaft means, the opposite end of said shaft means projecting outwardly from said surface means to control the movement of the tap.

3. The tapping attachment recited in claim 1, wherein said shaft means has opposite ends, a set of screw threads formed around a first end of said shaft means and a set of axially extending, parallel aligned splines formed along the opposite end, the screw threads at the first end of said shaft means being received by said means for converting the movement of said shaft means into movement of the tap.

4. The tapping attachment recited in claim 3, wherein said means for converting the linear movement of said shaft means into linear and rotary movements of the tap includes an internally screw threaded roller nut to receive the screw threaded first end of said shaft means, such that a linear movement of said screw threaded end through said screw threaded roller nut causes a rotation and linear movement of the spline end of said shaft means.

5. The tapping attachment recited in claim 4, wherein said means for converting the linear movement of said shaft means into linear and rotary movements of the tap also includes spline nut means having a central opening extending therethrough and a set of axially extending, parallel aligned splines formed therein, the spline end of said shaft means being received in and slidable axially through the splined central opening of said spline nut means, such that a rotation of said shaft means causes a corresponding rotation of said spline nut means.

6. The tapping attachment recited in claim 5, wherein said means for converting the linear movement of said shaft means into linear and rotary movements of the tap also includes internally screw threaded lead nut means and lead screw means, said lead screw means having a head attached to and rotatable with said spline nut means and a screw threaded shank rotatable through said internally threaded lead nut means, such that said lead screw means is movable linearly with respect to said lead nut means.

7. The tapping attachment recited in claim 6, wherein said means for converting the linear movement of said shaft means into linear and rotary movements of the tap also includes collet means to retain the tap, said collet means interconnected with said lead screw means so as to be rotated and moved linearly therewith such that the tap is correspondingly rotated and advanced into the hole of the workpiece when said lead screw means is rotated by said spline nut means and moved linearly with respect to said lead nut means.

8. The tapping attachment recited in claim 7, wherein the thread pitch of each of the tap and the screw threaded shank of said lead screw means is equal to one another but smaller than the thread pitch of the screw threaded end of said shaft means, such that the linear distance advanced by the tap is less than the linear movement of the spline end of said shaft means through the central opening of said splined nut means.

9. The tapping attachment recited in claim 7, wherein the screw threaded shank of said lead screw means is hollow, said collet means including a compression spring and a sleeve to carry the tap, said compression spring and sleeve being located within said hollow shank, such that said sleeve is movable through said shank and against the normal bias of said spring in the event that the tap strikes a surface of the workpiece in which there is no hole.

10. The tapping attachment recited in claim 1, wherein said pneumatically operated means for returning said surface means to the first position from the second position includes piston means interfaced with said surface means, the body of said tapping attachment having cylinder means formed therein through which said piston means reciprocates when said surface means moves between said first and second positions.

11. The tapping attachment recited in claim 10, further comprising gas reservoir means and a gas supply path to supply gas from said reservoir means to said cylinder means, said piston means moving in a first direction through said cylinder means to compress the gas therewithin when said surface means moves from said first to said second position, and the gas compressed within said cylinder means forcing said piston means to move in an opposite direction through said cylinder means to return said surface means to said first position.

12. The tapping attachment recited in claim 1, further comprising oil reservoir means, an oil supply path through which oil is supplied from said reservoir means to the tap for lubricating the tap, and pump means for pumping oil from said reservoir means to the tap via said supply path.

13. The tapping attachment recited in claim 12, further comprising an oil pump piston interfaced with said oil supply path to pump oil from said reservoir means to the tap, and oil pump actuator means interconnected with said oil pump piston and being capable of reciprocal movement to cause a corresponding reciprocation of said piston and, therefore, the pumping of oil from said oil reservoir means.

14. The tapping attachment recited in claim 13, further comprising compression spring means interconnected with said oil pump actuator means to bias said actuator means for reciprocal movement when said actuator means is moved toward said spring means to thereby compress said spring means.

15. A tapping unit having a tap for threading a hole formed in a workpiece, said tapping unit comprising:
shaft means having screw threads formed at a first end thereof and splines formed at an opposite end;
screw threaded nut means for receiving the screw threaded end of said shaft means;
surface means to which a force is applied for causing said surface means to move in a first direction, said surface means interconnected with said shaft means for correspondingly moving the screw threaded end of said shaft means linearly through said screw threaded nut means to cause said shaft means to rotate;
nut means having internal splines at which to receive the spline end of said shaft means, said spline end being moved linearly through said splined nut means, whereby the linear movement and rotation of said shaft means is imparted to said splined nut means; and
motion transferring means connected between said splined nut means and the tap to transfer the linear movement and rotation imparted to said splined nut means to the tap and thereby cause a corresponding linear advancement and rotation of the tap in the hole of the workpiece.

16. The tapping unit recited in claim 15, wherein said tapping unit includes a body to be received at and supported by a punch press, said punch press applying the force to said surface means to cause said surface means to move in said first direction.

17. The tapping unit recited in claim 15, wherein said shaft means includes a flange formed at the screw threaded end thereof, and said surface means includes first and second thrust bearings interconnected with the flange of said shaft means, the spline end of said shaft means projecting outwardly from said surface means for receipt by the splines of said splined nut means.

18. The tapping unit recited in claim 15, further comprising piston means interfaced and movable with said surface means, and cylinder means through which said piston means is moved to move said surface means in an opposite direction and thereby cause the tap to be retracted from the hole in the workpiece.

19. The tapping unit recited in claim 15, wherein said screw threaded nut means is a roller nut.

20. The tapping unit recited in claim 18, further comprising gas reservoir means and a gas supply path to supply gas from said reservoir means to said cylinder means, said piston means movable with said surface means in the first and opposite directions for compressing the gas within said cylinder means when said piston means moves in said first direction and for moving said surface means to cause a retraction of the tap from the hole in the workpiece when said piston means moves in said opposite direction.

21. A tapping unit having a tap for threading a hole formed in a workpiece, said tapping unit comprising:
shaft means;
surface means to which a force is applied for causing said surface means to be moved from a first position to a second position, said surface means interconnected with said shaft means for correspondingly moving said shaft means linearly in a first direction;
transmission means located between said shaft means and the tap, said transmission means having motion translating means in which to receive said shaft means and covert the linear movement of said shaft means into both linear and rotary movements of the tap to advance the tap into and thread the hole in the workpiece; and
piston means interfaced with said surface means for returning said surface means to the first position from the second position to thereby cause the shaft means to be moved linearly in an opposite direction and the tap to be withdrawn from the workpiece.

22. The tapping unit recited in claim 21, wherein said shaft means has screw threads formed at one end thereof and splines formed at the opposite end, the motion translating means of said transmission means including screw threaded nut means for receiving the screw threaded end of said shaft means, said shaft means moving linearly in the first direction through said screw threaded nut means in response to the force applied to said surface means for causing said shaft means to rotate.

23. The tapping unit recited in claim 22, wherein said screw threaded nut means is a roller nut.

24. The tapping unit recited in claim 22, the motion translating means of said transmission means further including nut means having a plurality of internal splines for receiving the spline end of said shaft means, said spline end being moved linearly through said splined nut means, whereby the linear movement and rotation of said shaft means is imparted to said splined nut means; and means to carry the tap connected to and movable with said splined nut means, such that the linear movement and rotation of said splined nut means causes a corresponding linear advancement and rotation of the tape in the hole of the workpiece.

25. The tapping unit recited in claim 21, further comprising cylinder means through which said piston means is moved, gas reservoir means, and a supply path to supply gas from said reservoir means to said cylinder means, said surface means moving from the first to the second position for moving said piston means in said first direction through said cylinder means to compress the gas therewithin, and said piston means moving in said opposite direction through said cylinder means to return said surface means to said first position when the force applied to said surface means is discontinued.

* * * * *